(12) United States Patent
McDonald

(10) Patent No.: US 9,982,632 B2
(45) Date of Patent: May 29, 2018

(54) SYSTEMS AND METHODS FOR A HYDROGEN FUEL SYSTEM

(71) Applicant: John McDonald, Centerville, TX (US)

(72) Inventor: John McDonald, Centerville, TX (US)

(*) Notice: Subject to any disclaimer, the term of this patent is extended or adjusted under 35 U.S.C. 154(b) by 0 days. days.

(21) Appl. No.: 15/147,937

(22) Filed: May 6, 2016

(65) Prior Publication Data

US 2017/0145960 A1   May 25, 2017

Related U.S. Application Data

(60) Provisional application No. 62/152,139, filed on Apr. 24, 2015.

(51) Int. Cl.
| | | |
|---|---|---|
| F02M 21/02 | (2006.01) | |
| C25B 15/02 | (2006.01) | |
| F02B 43/04 | (2006.01) | |
| C25B 1/04 | (2006.01) | |
| C25B 9/04 | (2006.01) | |

(52) U.S. Cl.
CPC ........... *F02M 21/0206* (2013.01); *C25B 1/04* (2013.01); *C25B 9/04* (2013.01); *C25B 15/02* (2013.01); *F02B 43/04* (2013.01); *F02M 21/0221* (2013.01)

(58) Field of Classification Search
CPC . C25B 9/00; C25B 9/04; F02M 25/12; F02M 21/0206; F02B 65/00
See application file for complete search history.

(56) References Cited

U.S. PATENT DOCUMENTS

| | | | | |
|---|---|---|---|---|
| 3,374,158 | A * | 3/1968 | Lord | C25B 1/12 204/270 |
| 4,031,865 | A * | 6/1977 | Dufour | F02B 43/10 123/1 A |
| 5,458,095 | A * | 10/1995 | Post | C25B 1/04 123/3 |
| 7,883,802 | B2 * | 2/2011 | Levine | H01M 4/861 429/401 |
| 2007/0034426 | A1 * | 2/2007 | Akamatsu | B82Y 10/00 123/3 |
| 2010/0200423 | A1 * | 8/2010 | Miles | C25B 1/02 205/638 |
| 2011/0017153 | A1 * | 1/2011 | Moon | C25B 1/04 123/3 |
| 2011/0017607 | A1 * | 1/2011 | Moon | C25B 1/04 205/628 |
| 2013/0230747 | A1 * | 9/2013 | Patolsky | H01M 4/9008 429/9 |
| 2014/0072836 | A1 * | 3/2014 | Mills | C25B 1/04 429/8 |
| 2015/0171439 | A1 * | 6/2015 | Devoe | H01M 8/0215 429/480 |

* cited by examiner

*Primary Examiner* — Long T Tran
(74) *Attorney, Agent, or Firm* — Pierson IP, PLLC

(57) ABSTRACT

Examples of the present disclosure are related to systems and methods for a hydrogen fuel system that is configured to reduce the amount of fossil fuel consumed by an internal combustion engine, while reducing emissions from the exhaust of the internal combustion engine into the atmosphere.

4 Claims, 19 Drawing Sheets

FIG. 6
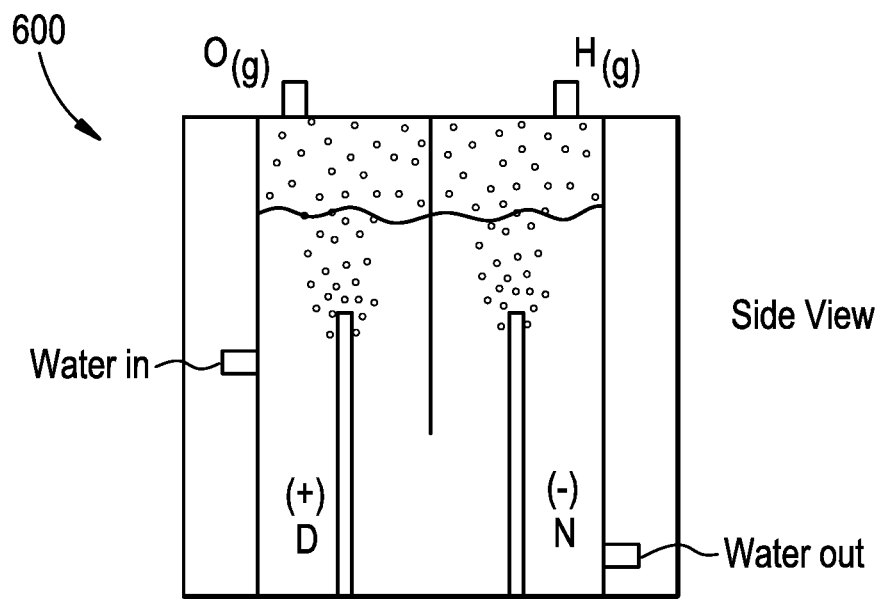
Side View
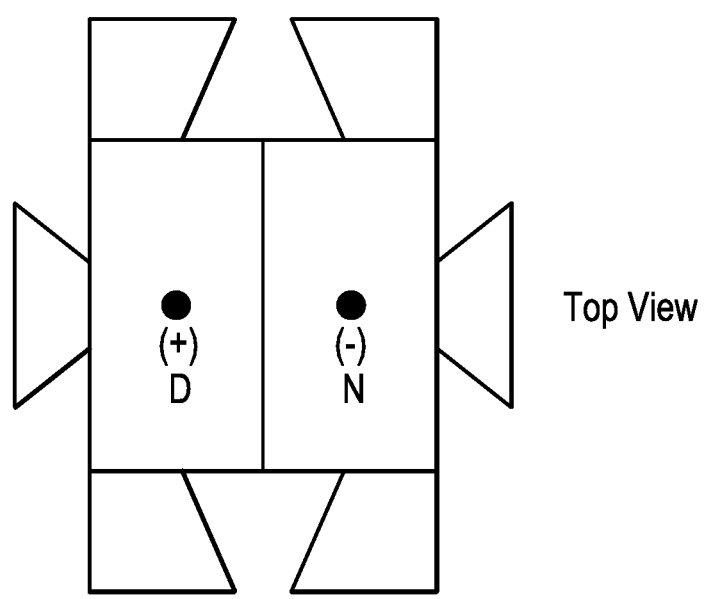
Top View

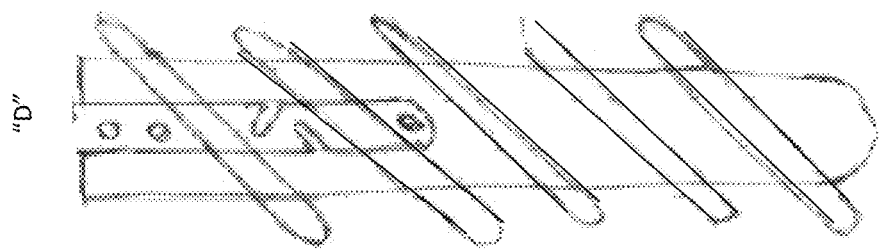
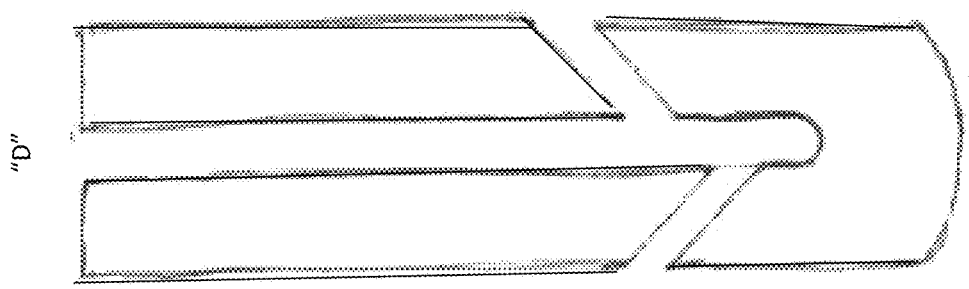
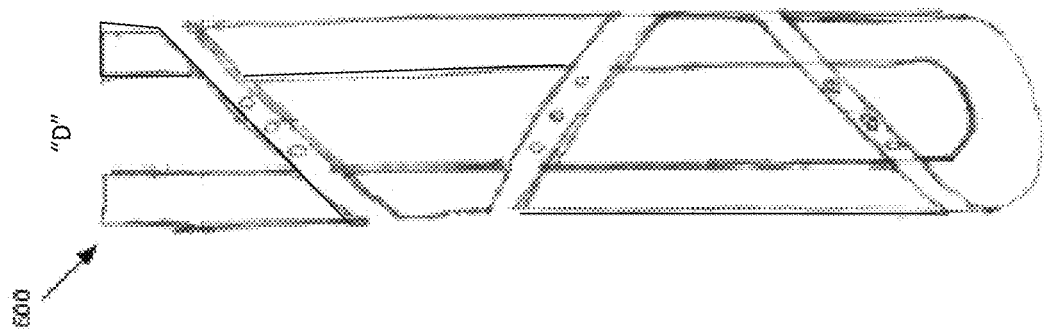
FIGURE 11

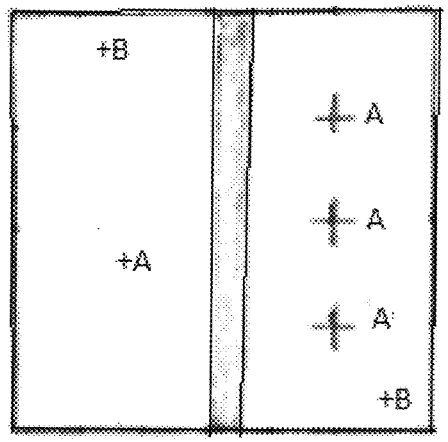
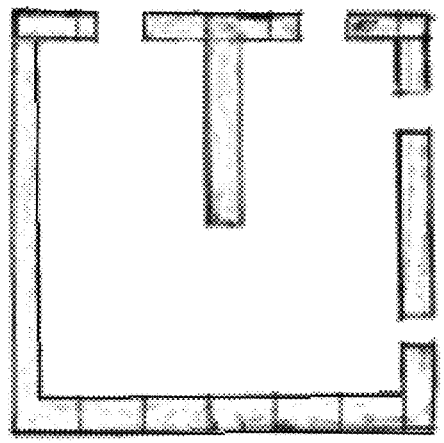 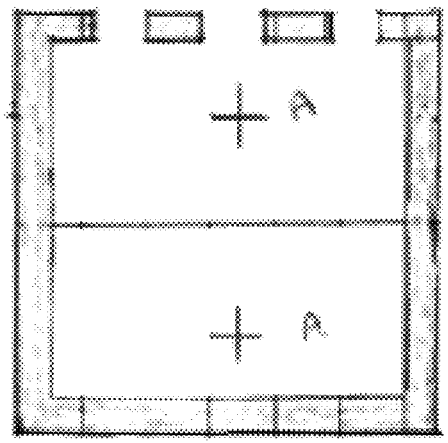
FIGURE 16

|  |  |  |  |  | +B |
|---|---|---|---|---|---|
| #7 | #8 | #9 | #10 | #11 | #12 +A |
|  |  |  |  |  | +A   +A |
|  |  |  |  |  | +A |
|  |  |  |  |  | +A |
|  |  |  |  |  | +B |
| #1 | #2 | #3 | #4 | #5 | #6 |

FIGURE 19

SYSTEMS AND METHODS FOR A HYDROGEN FUEL SYSTEM

CROSS-REFERENCE TO RELATED APPLICATIONS

This application claims a benefit of priority under 35 U.S.C. § 119 to Provisional Application No. 62/152,139 filed on Apr. 24, 2015, which is fully incorporated herein by reference in its entirety.

BACKGROUND INFORMATION

Field of the Disclosure

Examples of the present disclosure are related to systems and methods for a hydrogen fuel system that is configured to reduce the amount of fossil fuel consumed in internal combustion engines. Systems and methods disclosed herein may also reduce emissions from an exhaust of the internal combustion engine into the atmosphere. Systems and methods disclosed herein may also be used to produce hydrogen as an alternative fuel for producing electricity/energy Background A hydrogen vehicle is a vehicle that uses hydrogen as its onboard fuel for motive power. Hydrogen vehicles convert the chemical energy of hydrogen to mechanical energy by burning hydrogen in an internal combustion engine, or by reacting hydrogen with oxygen in a fuel cell to run electric motors.

Typically combustion engines are fueled by hydrocarbons. These combustion engines are used to power vehicles directly or are used to drive electric generators that provide power to electric drive motors. Hydrogen creates no carbon-based emission, and is therefore a desirable fuel source.

Conventionally, hydrogen engines can combust hydrogen which is drawn from pressurized storage tanks. These storage tanks are filled directly with hydrogen in a similar fashion that conventional vehicles are filled with gas at a gas station. Accordingly, conventional hydrogen engines require an outside source of hydrogen to operate. However, situations may arise where a hydrogen engine is not able to obtain an outside source of hydrogen.

Accordingly, needs exist for hydrogen fuel systems that generate their own hydrogen gas, and the generated hydrogen gas may allow an internal combustion engine to operate more efficiently and effectively.

SUMMARY

Embodiments described herein disclose a hydrogen fuel system that is configured to reduce the amount of fossil fuel consumed by an internal combustion engine, while reducing emissions from the exhaust of the internal combustion engine into the atmosphere. The hydrogen fuel system may be configured to allow an engine to burn fossil fuel (diesel, gasoline, etc.) more efficiently. The hydrogen fuel system may introduce hydrogen gas and oxygen gas into an air/fuel mixture that engine operates with, wherein the hydrogen fuel system may generate its own hydrogen gas from water.

In embodiments, the hydrogen fuel system may generate sufficient hydrogen gas that when the hydrogen gas is introduced into the air/fuel mixture, the amount of fossil fuels consumed by the vehicle may be reduced. Accordingly, the carbon footprint associated with the vehicle may be reduced. The hydrogen fuel system may be installed on any type of vehicle that utilizes a fossil fuel engine. For example, the hydrogen fuel system may be installed in cars, trucks, boats, tractors, etc.

In embodiments, the hydrogen fuel system may be a self-contained system that is mounted within a vehicle. The hydrogen fuel system may include uniquely design hydrogen generating cells, as well as controls configured to operate the system with the vehicle's existing electronic control unit.

Embodiments may include a liquid holding tank, a liquid processing tank, and a hydrogen cell.

The liquid holding tank may be configured to secure and store a proprietary liquid. The proprietary liquid may be comprised of chlorides and distilled water. The liquid holding tank may include fuel level indictors that are configured to determine the level of liquid within the liquid holding tank. The liquid may be displaced from the liquid holding tank into the liquid processing tank via a first pump.

The liquid processing tank may be configured to generate hydrogen. A pump/level indicator may be positioned within the water processing tank, wherein the pump/level indicator is configured to transmit a signal to a second pump. The transmitted signal may be configured to initiate a process for the second pump to circulate the proprietary liquid from the liquid processing thank into the hydrogen generating cell.

The hydrogen cell may be configured to break electrochemical bonds in the proprietary liquid, which allows hydrogen gas and oxygen gas to escape from the hydrogen cell. In embodiments, the hydrogen cell may include a cathode tube and an anode tube. The proprietary liquid may be configured to flow through the anode tube that is coupled to the positive power of a vehicle's battery and into a cathode tube.

As the proprietary liquid flows from the anode tube into the cathode tube, the proprietary liquid may pass throw a fixed or nonmoving turbine. The turbine, may be configured to circulate the proprietary liquid between the anode and cathode tube, allowing the electrical current between the anode and cathode to break the electrochemical bonds in the proprietary liquid. This may allow hydrogen gas and oxygen gas to be generated by the proprietary liquid, and exit the hydrogen generating cell via a level control tube.

When the vehicle's engine requires additional air/fuel mixture, the vehicle's electronic control unit may be configured to control the amperage from the vehicle's battery to the anode tube. In embodiments, the proprietary liquid may be cycled through the hydrogen g cell a plurality of times. Responsive to the proprietary liquid no longer producing hydrogen, the proprietary liquid may be removed from the liquid processing tank.

In embodiments, the hydrogen gas and oxygen gas generated in the liquid processing tank may be vacuumed into the vehicle's engine air intake via a hose.

In embodiments, a deplating switch may be installed between the vehicle's anode and cathode, wherein the deplating switch may be controlled by the vehicle's electronic control unit. The deplating switch may be configured to reverse the polarity of the anode tube and the cathode tube, which may remove or reduce plating or build up on the tubes due to impurities in the liquid. The impurities may settle to the bottom of the hydrogen generating cell where they may be removed.

In embodiments, a second tank may be configured to secure and hold a proprietary additive, wherein the proprietary additive is comprised of alcohol, acetone, xylene, and a lubricant. The proprietary additive may be configured to atomize the air/fuel mixture to burn more efficiently in the vehicle's engine.

In embodiments, the hydrogen fuel system may include software configured to control the electronic control unit. The software may be configured to allow the electronic control unit to control the vehicle's oxygen sensors and fuel sensors. The software may be configured to allow the engine to return to normal fossil fuel operation when it is not desirable to run the hydrogen fuel system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 6-13 depict embodiments of hydrogen fuel systems.

FIGS. 14-19 depict various schematics of hydrogen fuel systems.

Figure 1:
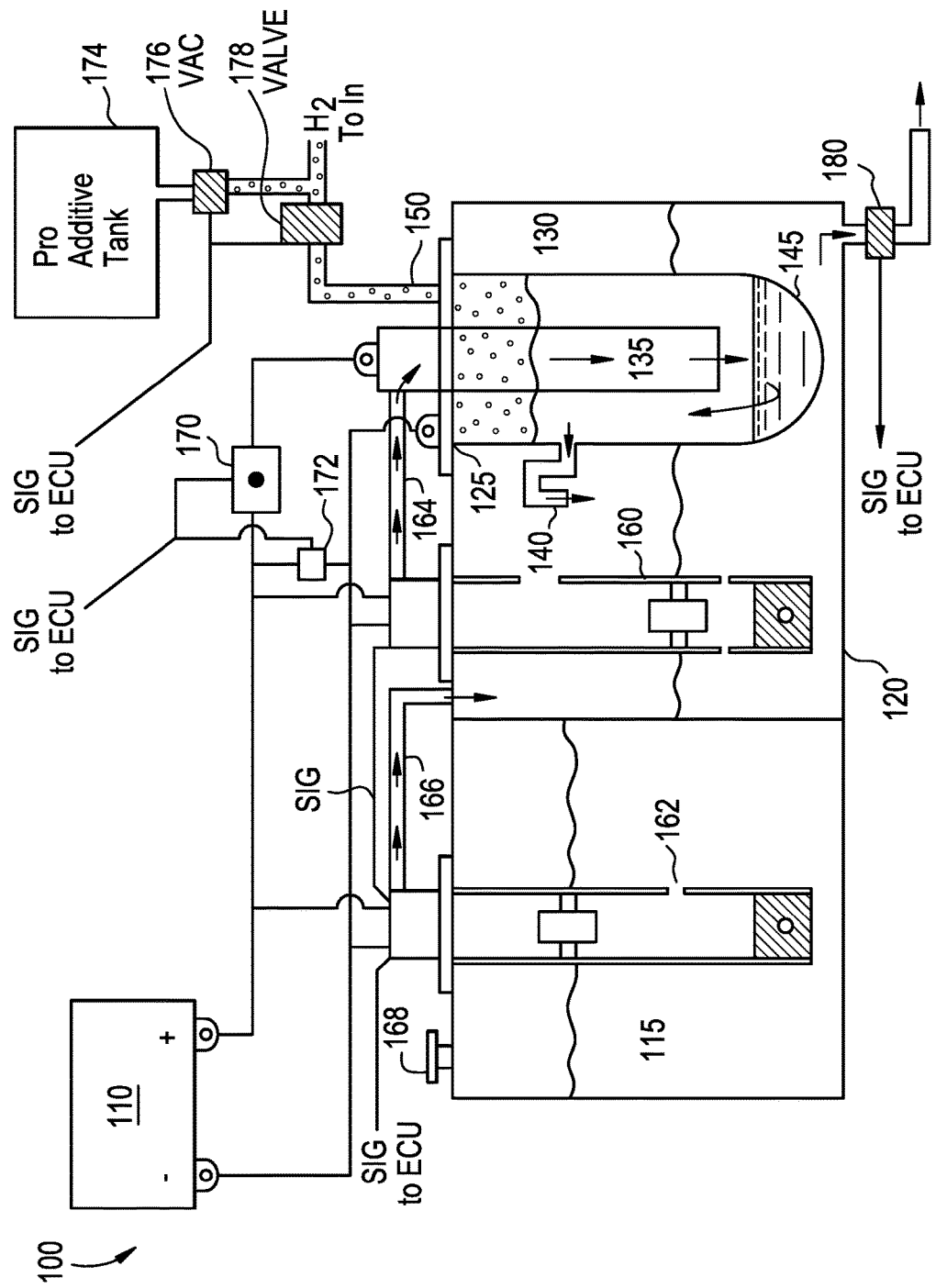
FIG. 1 depicts one embodiment of a topology for a hydrogen fuel system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments described herein disclose a hydrogen fuel system that is configured to reduce the amount of fossil fuel consumed by an internal combustion engine. The hydrogen fuel system may also reduce emissions from the exhaust of the internal combustion engine into the atmosphere. In embodiments, the hydrogen fuel system may be configured to allow an engine to burn fossil fuel (diesel, gasoline, etc.) more efficiently. The hydrogen fuel system may introduce hydrogen gas and oxygen gas into an air/fuel mixture that engine operates with, wherein the hydrogen fuel system may generate its own hydrogen gas from water.

FIG. 1 depicts one embodiment of a topology for hydrogen fuel system 100. Hydrogen fuel system 100 may include battery 110, liquid tank 115, liquid processing tank 120, hydrogen cell 125, cathode 130, anode 135, hydro cell overfill outlet 140, turbine 145, gas outlet 150, pump and fluid level indicators 160, 162, water transfer lines 164, 166, fill cap 168, adjustable rheostat 170, polarity deplate switch 172, additive tank 174, vacuum valve 176, 178, and solenoid dump valve 180.

Vehicle battery 110 may be a rechargeable battery that is configured to supply electric energy to a vehicle. Battery 110 may be configured to power a starter motor, lights, ignition system, and an electronic control unit within the vehicle. In embodiments, battery 110 may be configured to supply electric energy to pump & fluid level indicators 160, 162, and hydrogen cell 125. Battery 110 may also be configured to supply electric energy to hydrogen cell 125, polarity deplate switch 172, and adjustable rheostat 170.

Liquid tank 115 may be a storage tank that is configured to store and secure a proprietary liquid (referred to hereinafter as "liquid"). The liquid may be inserted into liquid tank 115 via a fill cap 168 that is disposed on an upper surface of liquid tank 115. Liquid tank 115 may also include a pump & fluid level indicator 162, wherein pump & fluid level indicator 162 may be positioned within liquid tank 115. Pump & fluid level indicator 162 may be configured determine the fluid level within liquid tank 115, and pump the liquid from tank 115 to tank 120.

The liquid stored within liquid tank 115 may be outlet from liquid tank 115 via water transfer line 166, wherein water transfer line 166 may transfer liquid from liquid tank 115 into liquid processing tank 120. Responsive to determining the fluid level of liquid in tank 115 is below a threshold, a processor associated with the pump/level indicator 162 may transmit a signal to the vehicles electronic control unit (ECU) when the liquid level in tank 115 needs to be refilled with Proprietary Water. Responsive to pump/level indicator 162 transmitting the signal, tank 115 may receive the proprietary water to raise the water level above a threshold.

Liquid processing tank 120 may be configured to generate hydrogen for hydrogen fuel system 100. Liquid processing tank 120 may be configured to receive liquid from liquid tank 115 via water transfer line 166. Liquid processing tank 120 may include a pump & level indictor 160, which is configured to determine a level of liquid within liquid processing tank 120. Responsive to pump & level indicator 160 determining the level of liquid within liquid processing tank 120, a processor associated with pump & level indicator 160 may transmit a signal to the vehicle's electronic control unit. If the vehicle's electronic control unit determines that the fluid level within liquid processing tank 120 is below a fluid threshold, then liquid may be displaced from liquid tank 115 into liquid processing tank 120 via liquid transfer line 166. Additionally, pump & level indicator 160 may be configured to circulate the liquid within liquid processing tank 120. The liquid stored within liquid processing tank 120 may be outlet from liquid processing tank 120 via water transfer line 164, wherein water transfer line 164 may transfer liquid from Liquid processing tank 120 into hydrogen cell 125.

Hydrogen cell 125 may be configured to break the electrochemical bonds within liquid positioned within hydrogen cell 125 via cathode 130 and anode 135 Cathode 130 and anode 135 are tubes, vessels, receptacles, etc, wherein cathode 130 and anode 135 may be comprised of stainless steel tubing. Hydrogen cell 125 may be configured in a tube in a tube arrangement, wherein anode 135 is positioned within cathode 130. In embodiments, anode 135 may be coupled to battery's 110 positive voltage, and cathode 130 may be coupled to battery's 110 negative voltage. Anode 135 may be coupled to battery's 110 positive voltage via adjustable rheostat 170.

Rheostat 170 may be configured to control the amperage from battery 110 to anode 135. Rheostat 170 may be controlled by the vehicle's electronic control unit. Responsive to the vehicle's electronic control unit determining that more hydrogen is required by the vehicle, rheostat 170 may dynamically control and increase the amperage from battery 110 to anode 135. Responsive to the vehicle's electronic control unit determining that less hydrogen is required by the vehicle, rheostat 170 may dynamically control and decrease the amperage from battery 110 to anode 135. Rheostat 170 may be configured to dynamically control the amperage from battery 110 to anode 135 based on the amount of hydrogen currently required by the vehicle.

Liquid may be configured to enter hydrogen cell 125 via pump & level indicator 160 and water transfer line 164. The liquid may be output from water transfer line 164 into anode 135. As the liquid flows through cathode 135 into cathode 130, the liquid may pass through turbine 145. Turbine 145 may be mounted on the bottom or a lower surface of cathode 130, wherein turbine 145 may rotate to circulate the liquid between anode 135 and cathode 130. Responsive to the liquid flowing between anode 135 and cathode 130, the electrochemical bonds in the liquid may break. The breaking of the electrochemical bonds may release hydrogen gas and oxygen gas, wherein the hydrogen gas and oxygen gas may rise to the top of hydrogen cell 125.

Responsive to a vehicle requiring hydrogen gas, the hydrogen gas may be released from hydrogen cell 125 via tube 150 via vacuum valve 178. In embodiments, the hydrogen gas and the oxygen gas generated within hydrogen cell 125, may be vacuumed into the vehicle's engine air intake via hose 150 and vacuum control valves 176, 178, which may be controlled by the vehicles' electronic control unit.

In embodiments, the liquid within hydrogen cell 125 may be outlet back into liquid processing tank 120 via hydro cell overfill outlet 140. The liquid within hydrogen cell 125 may have a higher liquid level than liquid processing tank 120. Accordingly, as the liquid is circulating within hydrogen cell 125, portions of the liquid may be outlet into liquid processing tank 120, wherein the liquid may reenter hydrogen cell 125 from liquid processing tank 120 via pump & fluid level indicator 160. The liquid may be recirculated within hydrogen cell 125 a plurality of times. Responsive to the liquid being recirculated within hydrogen cell 125 a plurality of times, the liquid may be removed from liquid processing tank 120 via dump valve 180. In embodiments, the liquid may be removed from system 100, and new liquid may be added to the system 100.

Hydrogen cell 125 may also be coupled to deplating switch 172. Deplating switch 172 may be positioned between the negative and positive wires from battery 110. Deplating switch 172 may be controlled by the vehicle's electronic control unit, and may be configured to reverse the polarity associated with anode 135 and cathode 130. Deplating switch 172 may change the polarities at predetermined intervals, or based on the level of impurities within the liquid 120. Responsive to deplating switch 172 changing the polarities, plaiting or buildup on the anode 135 and/or cathode 130 may be removed. The impurities within the liquid may settle to the bottom of liquid processing tank 120, and be removed from liquid processing tank 120 via dump valve 180 when dump valve 180 is opened.

In embodiments, pro-additive tank 174 may be coupled to vacuum valve 176. Additive tank 174 may include liquid additives that are comprised of alcohol, acetone, xylene, lubricants, etc. The additives stored within tank 174 may be configured to assist in the atomization of the air fuel mixture output to the vehicle's engine, such that the engine may run more efficiently. In embodiments, vacuum valve 176 may displace the additives stored within tank 174 in the vehicle's air intake.

In embodiments, the hydrogen fuel system 100 may include software configured to control the electronic control unit. The software may be configured to allow the electronic control unit to control the vehicle's oxygen sensors and fuel sensors. The software may be configured to allow the engine to return to normal fossil fuel operation when it is not desirable to run the hydrogen fuel system.

Figure 2:
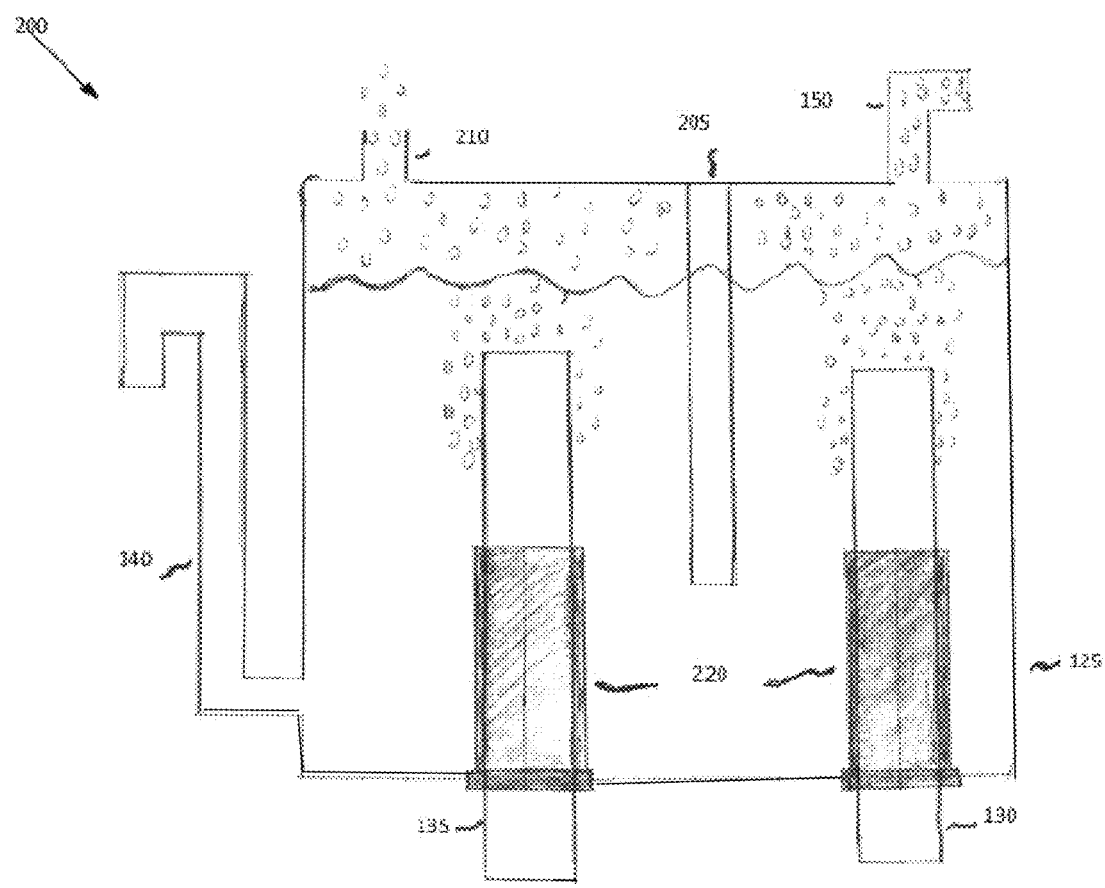
FIG. 2 depicts one embodiment of a topology for a hydrogen fuel system.

FIG. 2 depicts one embodiment of a topology for hydrogen fuel system 200. Certain elements described in FIG. 2 are described above. Therefore, for the sake of brevity another description of these elements is omitted.

Hydrogen fuel system 200 may be configured to reduce or eliminate problems with conventional hydrogen generators. When hydrogen fuel system 200 generates hydrogen using cathode 130 and anode 135, hydrogen fuel system 200 may also be configured to create oxygen. Both the hydrogen and the oxygen gas are vacuumed into the intake manifold of a conventional engine, and are mixed with air and fossil fuels. The mixture of hydrogen and oxygen gas allows for the engine to burn fuel more efficiently, which may create more horsepower, less fuel consumptions, and less carbon emissions.

However, conventionally, when the hydrogen and oxygen gas mixture is burned, the oxygen gas may cause problems with the engine's oxygen sensors. These problems may be caused by the additional oxygen gas that is introduced into the engine via a conventional hydrogen cell. Accordingly, hydrogen cell 125 may include electronic systems to deal with the extra oxygen gas that the oxygen sensors encounter.

Hydrogen cell 125 depicted in FIG. 2 may include a cathode 130 and anode 135, wherein cathode 130 and anode 135 are separated by glass wall 205. Cathode 130 and anode 135 may be configured to separate the hydrogen gas from the oxygen gas in hydrogen cell 125, wherein cathode 130 may be positioned on a first side of glass wall 205 and anode 135 may be positioned on a second side of glass wall 205. The hydrogen gas may be vacuumed into the engine, while the oxygen gas may be displaced into the atmosphere 210. Accordingly, only the desired hydrogen 150 may be introduced into the vehicle's engine.

Glass wall 205 may be configured to extend from an upper surface of hydrogen cell 125 towards a lower surface of hydrogen cell 125. However, glass wall 205 may not extend completely to the lower surface of hydrogen cell 125. Accordingly, liquid positioned within hydrogen cell 125 may flow from a first side to the second side of hydrogen cell 125. In embodiments, glass wall 205 may be comprised of various materials, such as glass, rubber, polymers, a rigid material, etc.

Cathode 130 and anode 135 may be insulated via insulation 220. Insulation 220 may be an electrical insulation comprising material whose internal electric charges do not flow freely. Therefore, insulation 220 may not allow cathode 130 and anode 135 to conduct an electric current under the influence of an electric field. Insulation 220 may be positioned on lower surfaces of cathode 130 and anode 135, and extend from the lower surface of cathode 130 and anode 135 to a position above the lower surface of glass wall 205. Accordingly, cathode 130 and anode 135 may generate electric fields above the lower surface of glass wall 205. However, cathode 130 and anode 135 may be prevented from generating electric fields below a lower surface of glass wall 205.

As such, the upper portions of cathode 130 and anode 135 are not insulated so current may pass between them. The upper portions of cathode 130 and anode 135 may be rods that are separated by glass wall 205 in a first design (box design) or separated by tubes in a second design. Therefore, the current may pass between cathode 130 and cathode 125, but the gas generated by each tube is kept separated by glass wall 205. The hydrogen gas bubbles created by cathode 130 may rise above a liquid line with hydrogen cell 125 in the first side of glass wall 205, and the oxygen gas bubbles created by anode 135 may rise above a liquid line within hydrogen cell in the second side of glass wall 205. Then, the hydrogen bubbles may be vacuumed from the ullage area of the cell to the vehicle's engine air intake, and the oxygen bubbles may be vented into the atmosphere.

Figure 3:
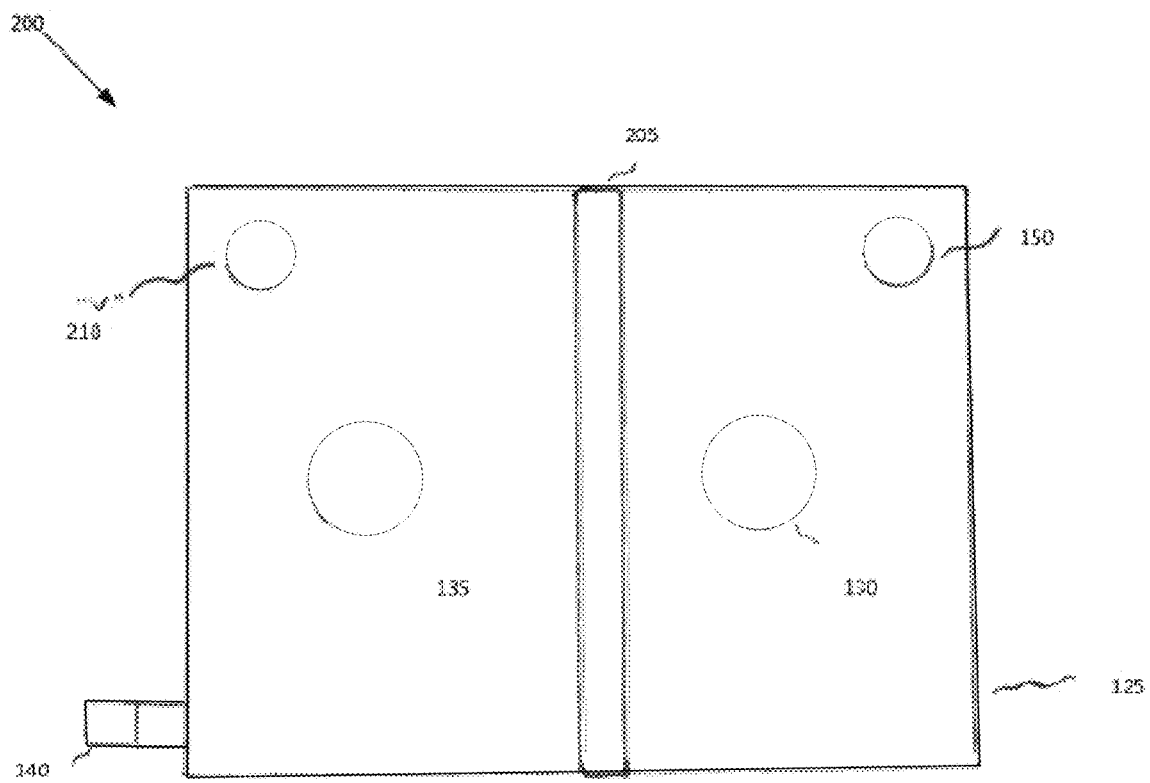
FIG. 3 depicts a top view of an embodiment of a hydrogen fuel system.

FIG. 3 depicts a top view of an embodiment of hydrogen fuel system 200. Certain elements described in FIG. 3 are described above. Therefore, for the sake of brevity another description of these elements is omitted.

As depicted in FIG. 3, glass wall 205 may be configured to extend from a first end of hydrogen cell 125 to a second end of hydrogen cell 125. Thus, glass wall 205 may partition hydrogen cell into at least two parts. Furthermore, as depicted in FIG. 3, outlets 210 and 150 may be positioned on the different sides of glass wall 205. Therefore, hydrogen gas may be vacuumed into the engine via vacuum 150, while the oxygen gas may be displaced into the atmosphere via outlet 210.

Figure 4:
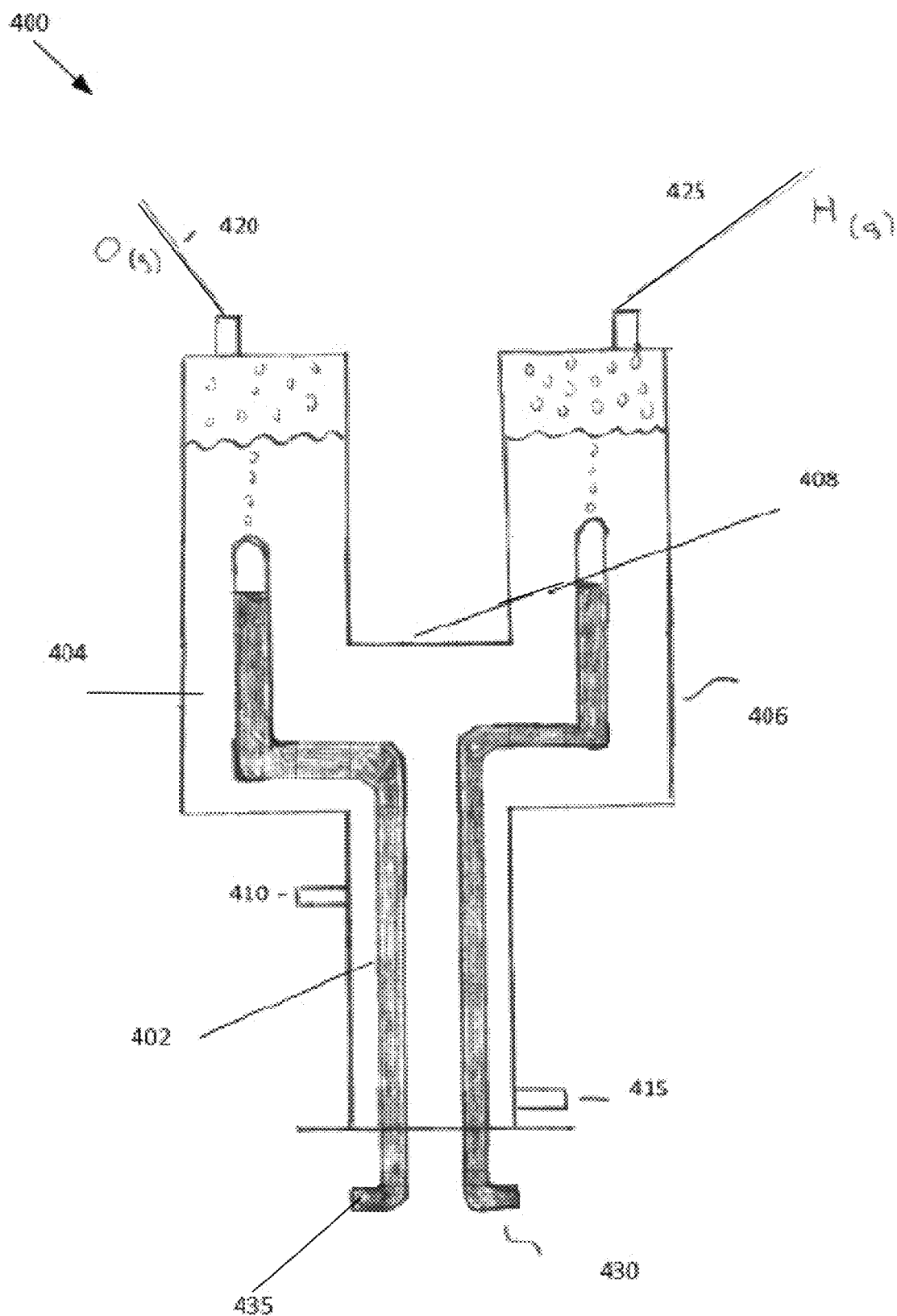
FIG. 4 depicts an embodiment of a hydrogen fuel system.

FIG. 4 depicts an embodiment of hydrogen fuel system 400. Certain elements described in FIG. 4 are described above. Therefore, for the sake of brevity another description of these elements is omitted.

Similar to hydrogen cell 200, hydrogen cell 400 partitions cathode 430 and anode 435 in different chambers. Liquid may flow into hydrogen cell 400 via inlet 410, and exit from hydrogen cell 400 via outlet 415.

Hydrogen cell 400 may include a shaft 402, first partition 404, and second partition 406. Insulated cathode 430 and insulated anode 435 may extend through shaft. Cathode 430 may extend into second partition 406. Within second partition 406, a first portion of cathode 430 may be insulated, and second portion of cathode 430 may not be insulated. Anode 435 may extend into first partition 404. Within first partition 404, a first portion of anode 435 may be insulated, and second portion of anode 435 may not be insulated.

In embodiments, the insulated portions of cathode 430 and anode 430 with the second partition 406 and first partition 408, respectively, may extend above a divergent plane 408. The exposed portions of cathode 430 and anode 430 with the second partition 406 and first partition 408, respectively, may be above divergent plane 408.

Therefore, the insulated portions of cathode 430 and anode 435 may not allow an electric current below divergent plane 408. However, cathode 430 and anode 435 may generate electric fields above divergent plane 408. To this end, gas generated by cathode 430 and anode 435 is kept separated by partitions 404, 406. The hydrogen gas bubbles created by cathode 430 may rise above a liquid line within second partition 406, and the oxygen gas bubbles created by anode 435 may rise above a liquid line within first partition 404. Then, the hydrogen bubbles may be vacuumed 425 from the ullage area of the cell to the vehicle's engine air intake, and the oxygen bubbles may be vented 420 into the atmosphere.

Figure 5:
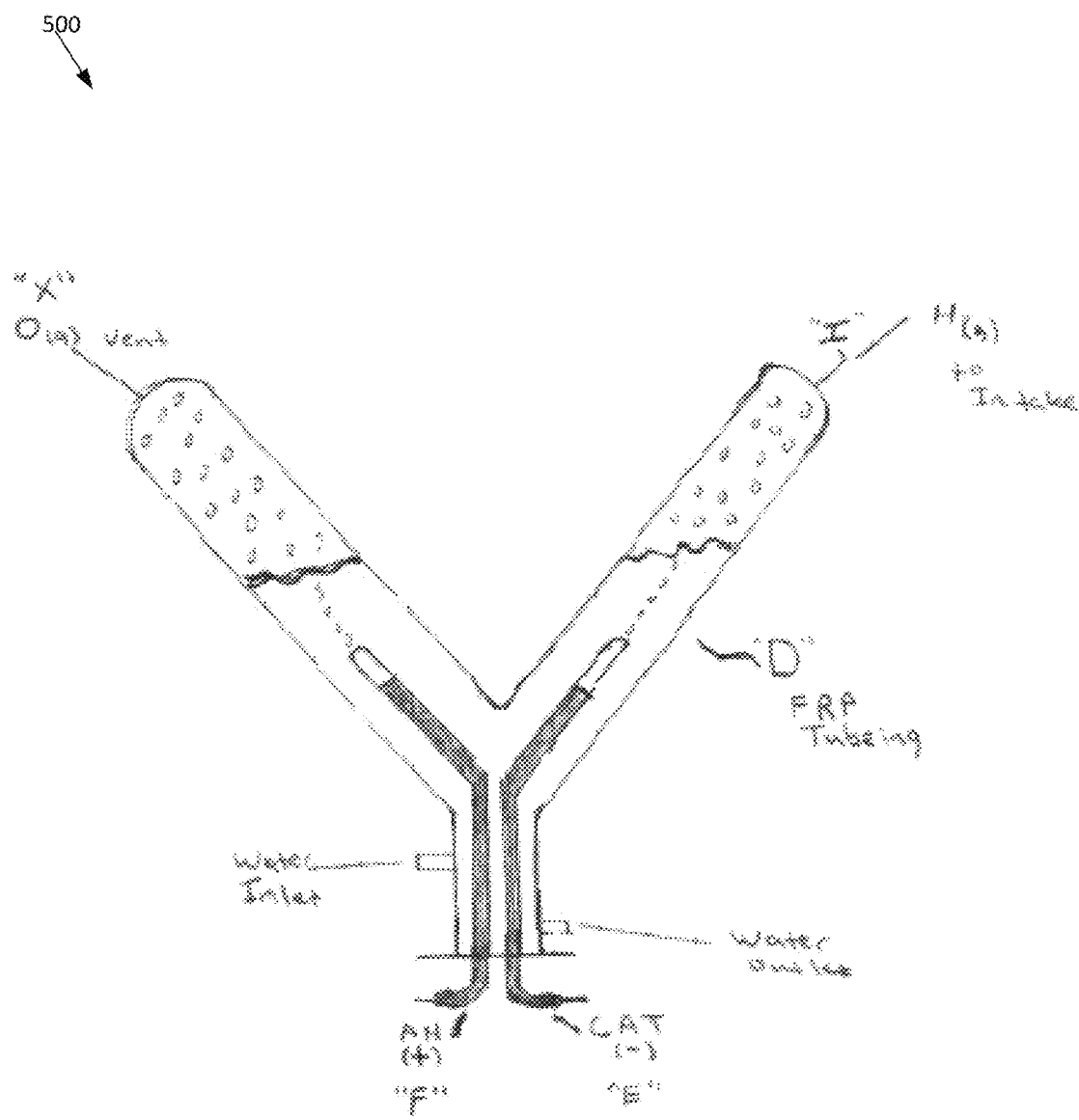
FIG. 5 depicts an embodiment of a hydrogen fuel system.
Figure 7:
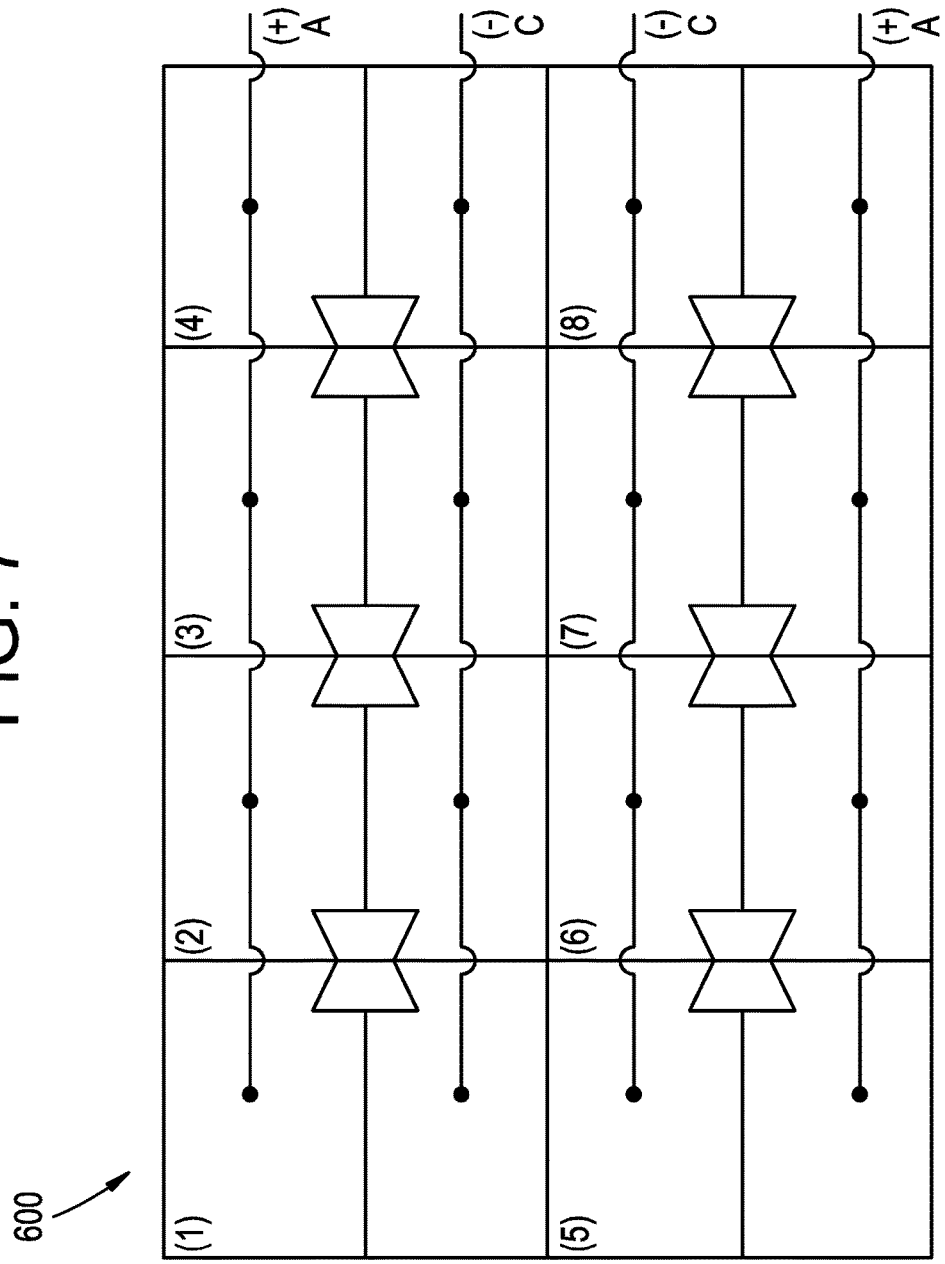
Figure 8:
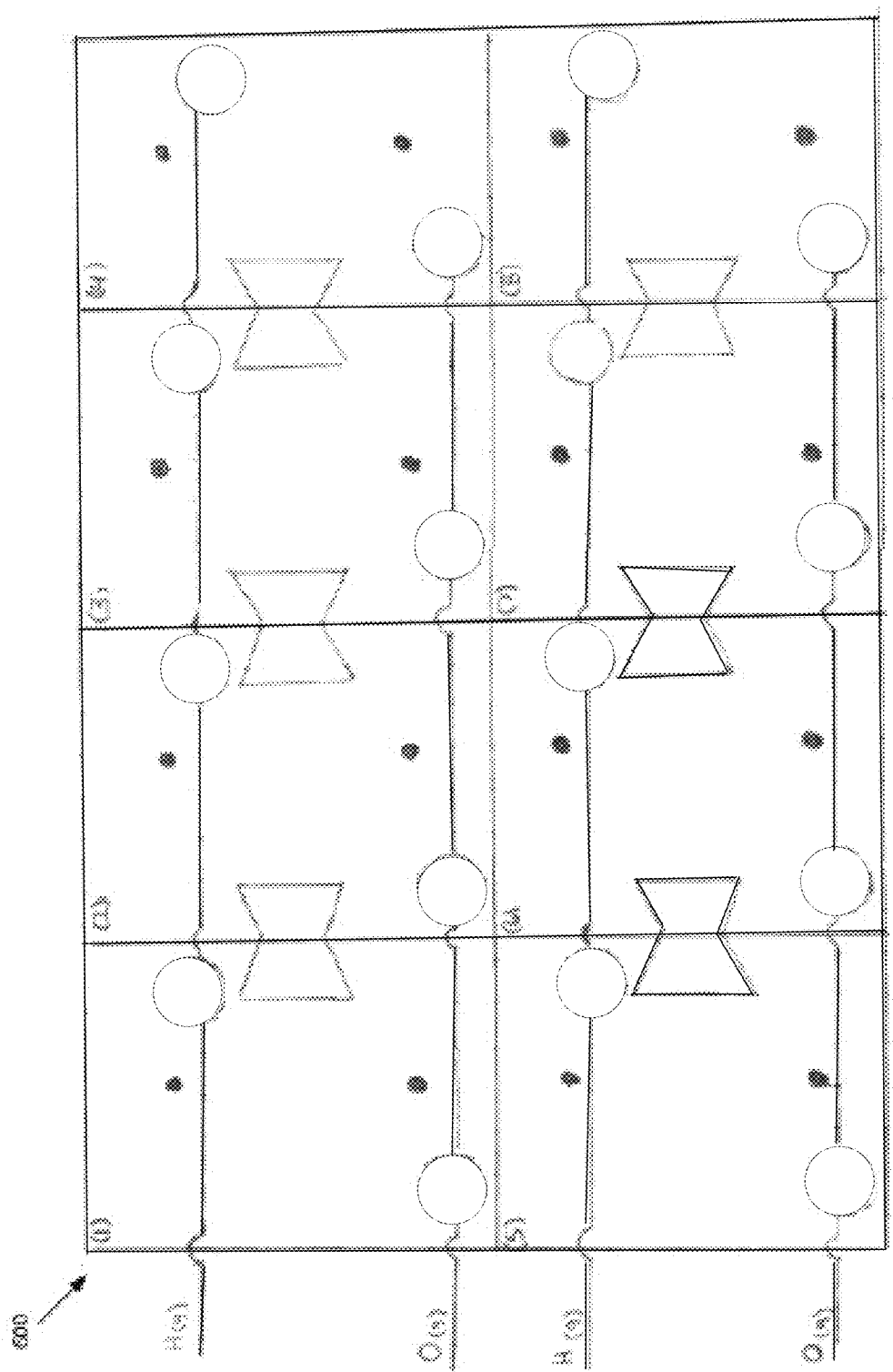
Figure 9:
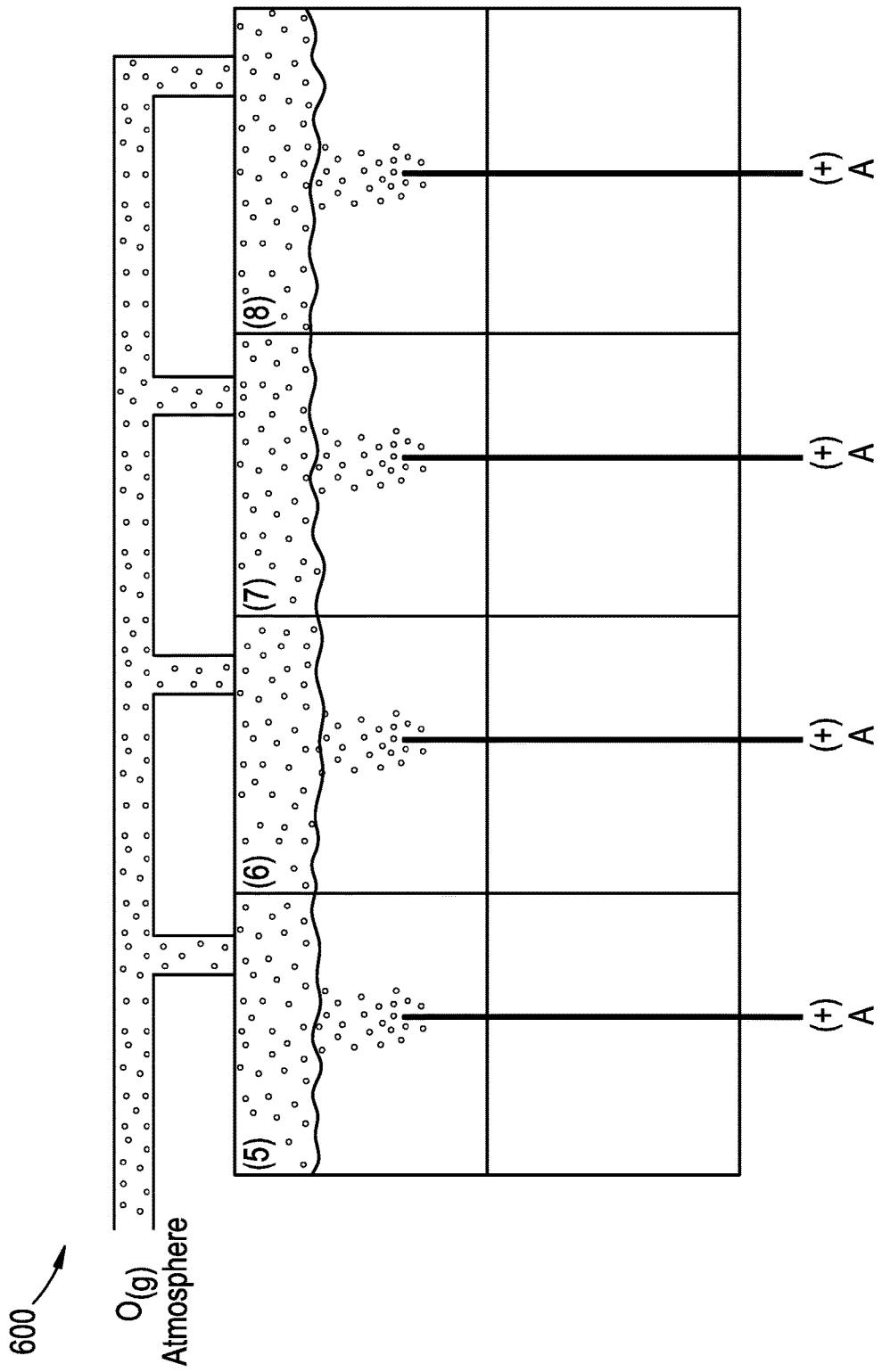
Figure 10:
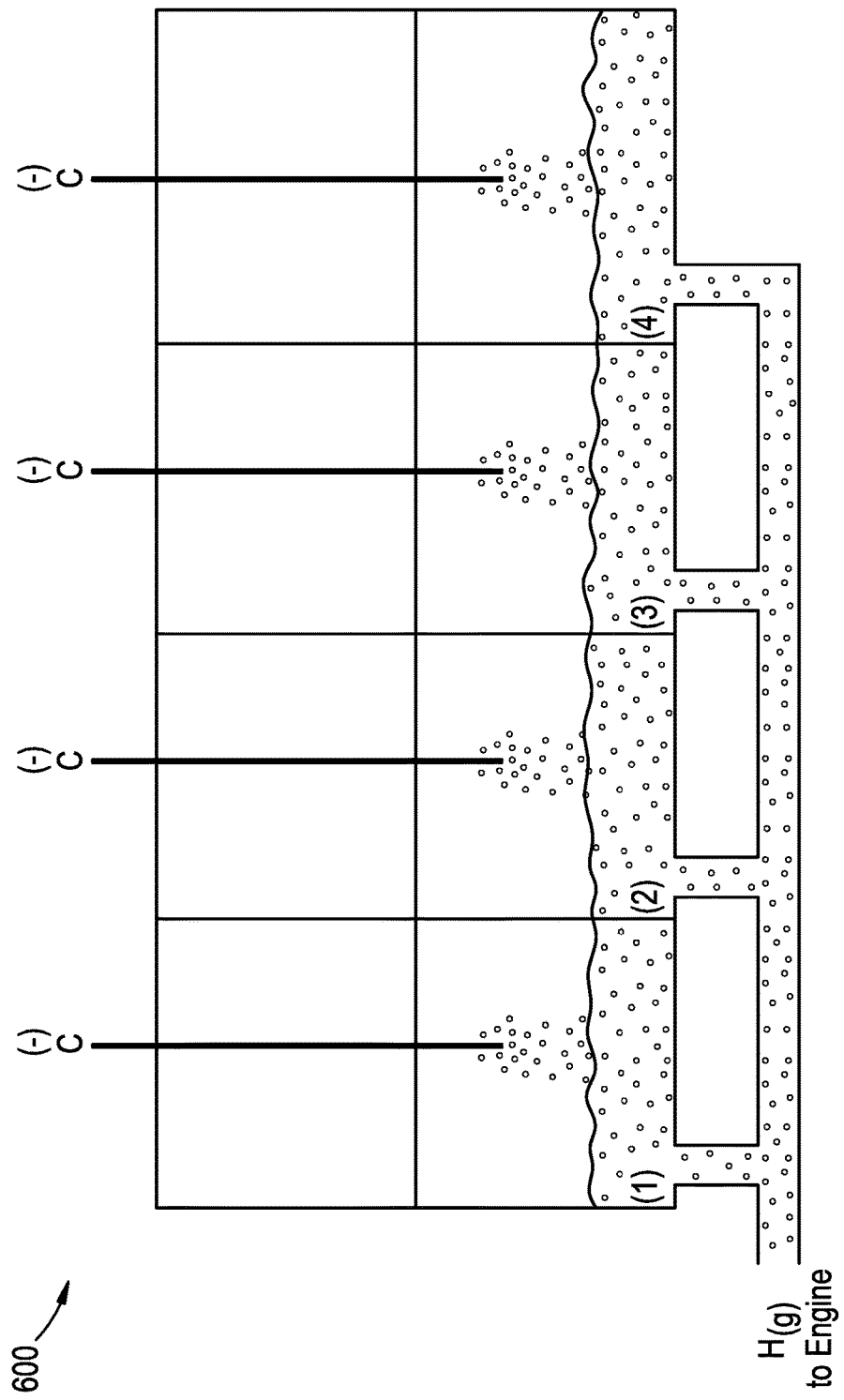
Figure 12:
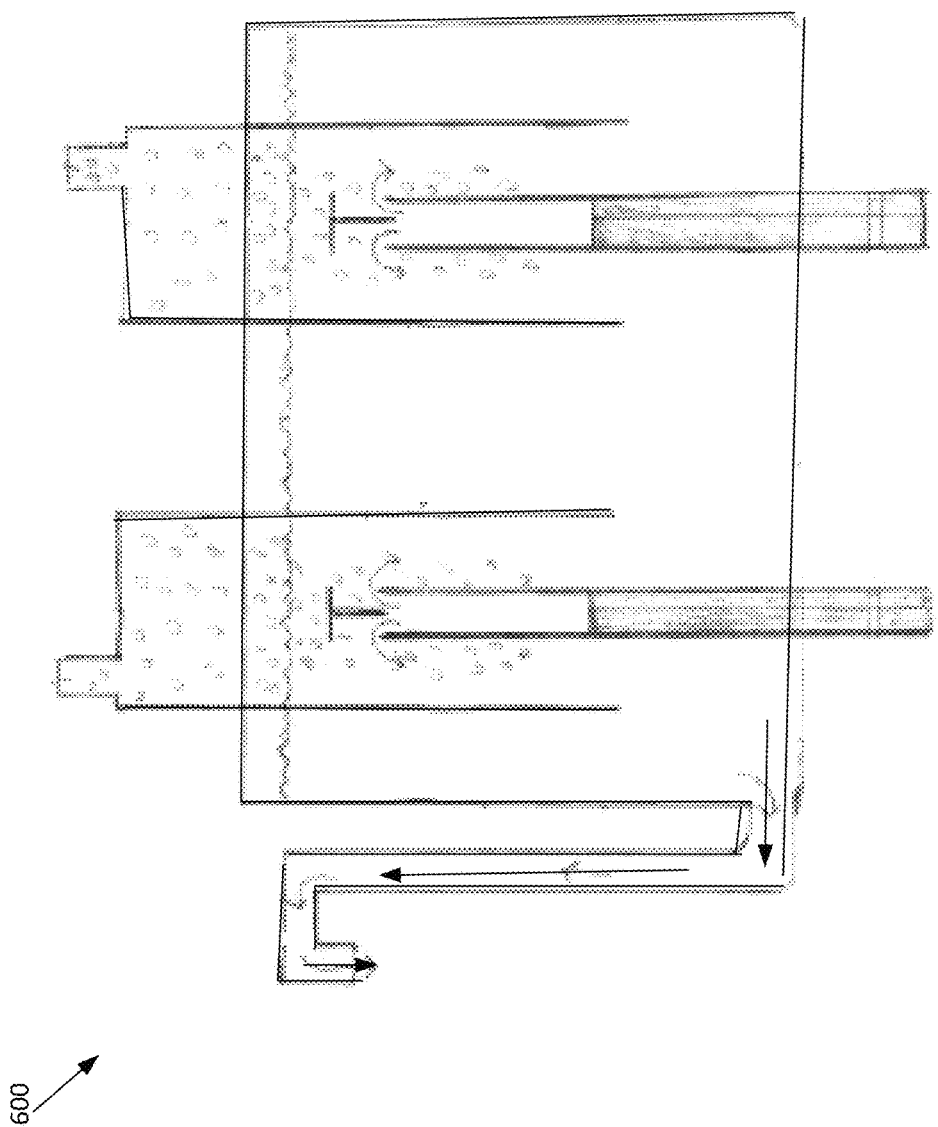
Figure 13:
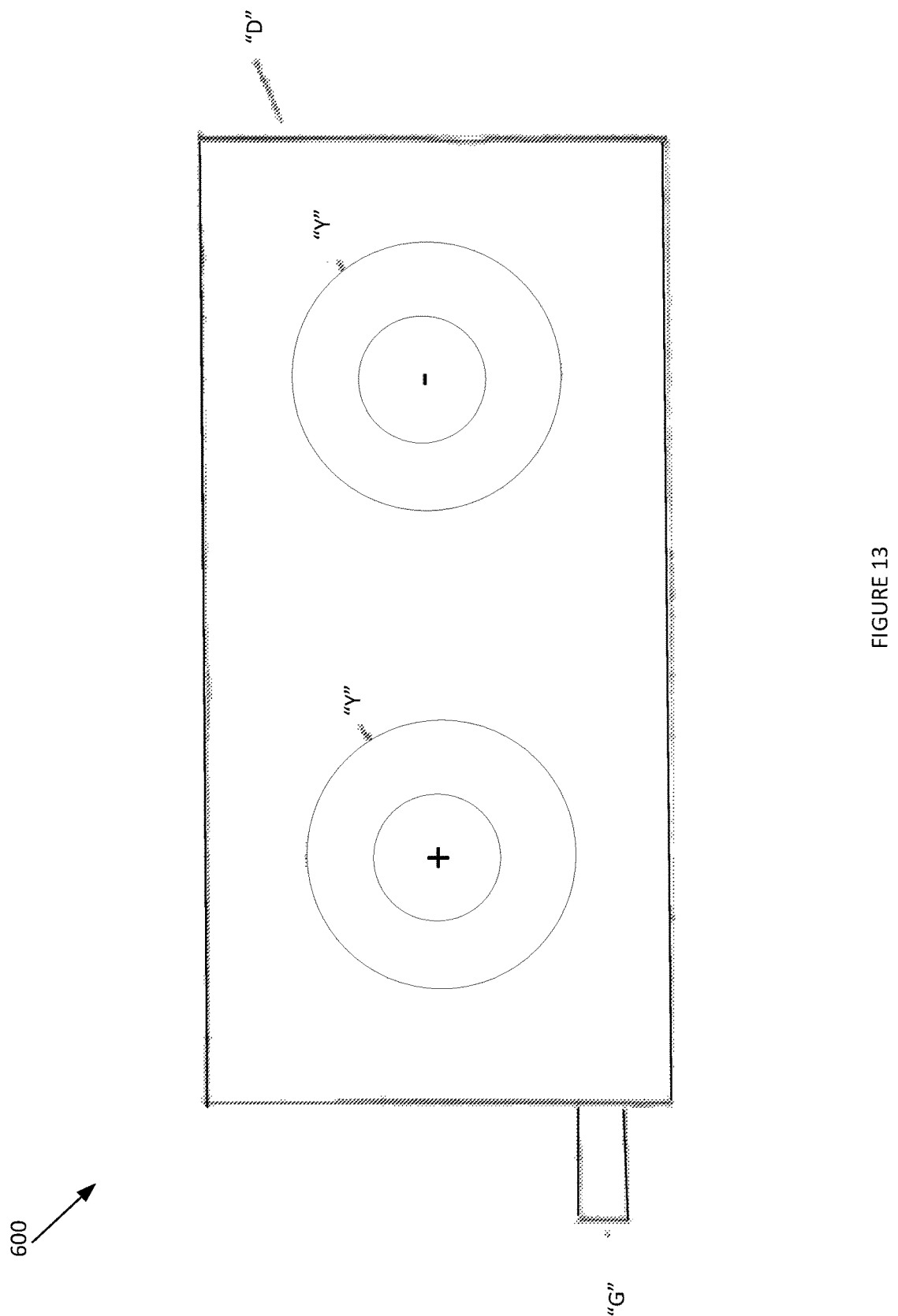

FIG. 5 depicts an embodiment of hydrogen fuel system 500. Certain elements described in FIG. 5 are described above. Therefore, for the sake of brevity another description of these elements is omitted.

Hydrogen fuel system 500 is substantially similar to that described above in FIG. 4. The general shape of hydrogen fuel system 500 is a "Y", while the general shape of hydrogen fuel system 400 is a "U". Utilizing the different shapes of hydrogen fuel systems 400, 500, different hydrogen fuel systems may be positioned within different vehicles based on shapes and/or sizing concerns.

Furthermore, utilizing hydrogen fuel system 500, the partitions of the anode and cathode may be more pronounced with a greater distance between the anode and cathode than in hydrogen fuel system 400.

FIGS. 6-13 depict embodiments of hydrogen fuel system 600. Certain elements described in FIGS. 6-13 are described above. Therefore, for the sake of brevity another description of these elements is omitted.

As depicted in FIGS. 6-13 there are various configurations and partitions of hydrogen fuel systems, wherein gas created from an anode is separated from gas created by a cathode.

Hydrogen fuel system 600 may be a hydrogen only fuel system configured for internal combustion engines and stirling engines. In embodiments, hydrogen fuel system 600 may include a plurality of hydrogen cells, wherein the hydrogen cells are coupled to each other. The hydrogen cells may be coupled together in series, and may be stacked upon one another. The hydrogen cells may be rectangular or square in shape. Each of the sides of hydrogen cells may have male and female couplings (i.e. dovetails or "V" slide fittings), wherein the hydrogen cells may couple with each other.

The hydrogen cells may include fluid inlets and outlets, wherein the inlets and outlets form manifolds. The inlets and outlets may be configured to be coupled with a pump that circulates liquid through the hydrogen cells.

The hydrogen cells may also include hydrogen gas and oxygen gas outlets. The gas outlets may also be configured to form unified manifolds. An oxygen gas manifold may be configured to vent oxygen into the atmosphere, while the hydrogen gas manifold may be configured to output hydrogen into the air intake of a hydrogen compressor. The hydrogen compressor may be a low pressure system configured to compress hydrogen, wherein the hydrogen may be stored in a storage tank. The hydrogen stored within the storage tank may be transmitted into the fuel system of an engine.

Hydrogen fuel system 600 may be utilized as a standalone hydrogen fuel system or as a hybrid hydrogen/fossil fuel system. The number of hydrogen cells required by a vehicle may be based on the vehicle size, wherein compact cars may only require one or two hydrogen cells, whereas trucks may require multiple hydrogen cells.

In embodiments, the current to each hydrogen cell may be independently controlled by a fixed rheostat, so that electric current flows evenly to each hydrogen cell.

Hydrogen fuel system 600 may be tube in tube system that is configured to allow better electrical contact between the liquid and the (−) cathode and the (+) anode. Hydrogen fuel system 600 may also be configured to pre-charges the liquid as it passes through the inside tube of the (−) C and the (+) A. Accordingly, hydrogen fuel system 600 may produce more hydrogen gas for a given current. (i.e. more hydrogen gas at less energy input).

In embodiments, the anode and cathode tubes may have multiple holes or prongs. The anode and cathode tubes may also be fluted or finned. These features will allow more hydrogen gas to be created per area and current. The fluting allows for the liquid water to circulate around the electrode for better water/current contact.

Figure 14:
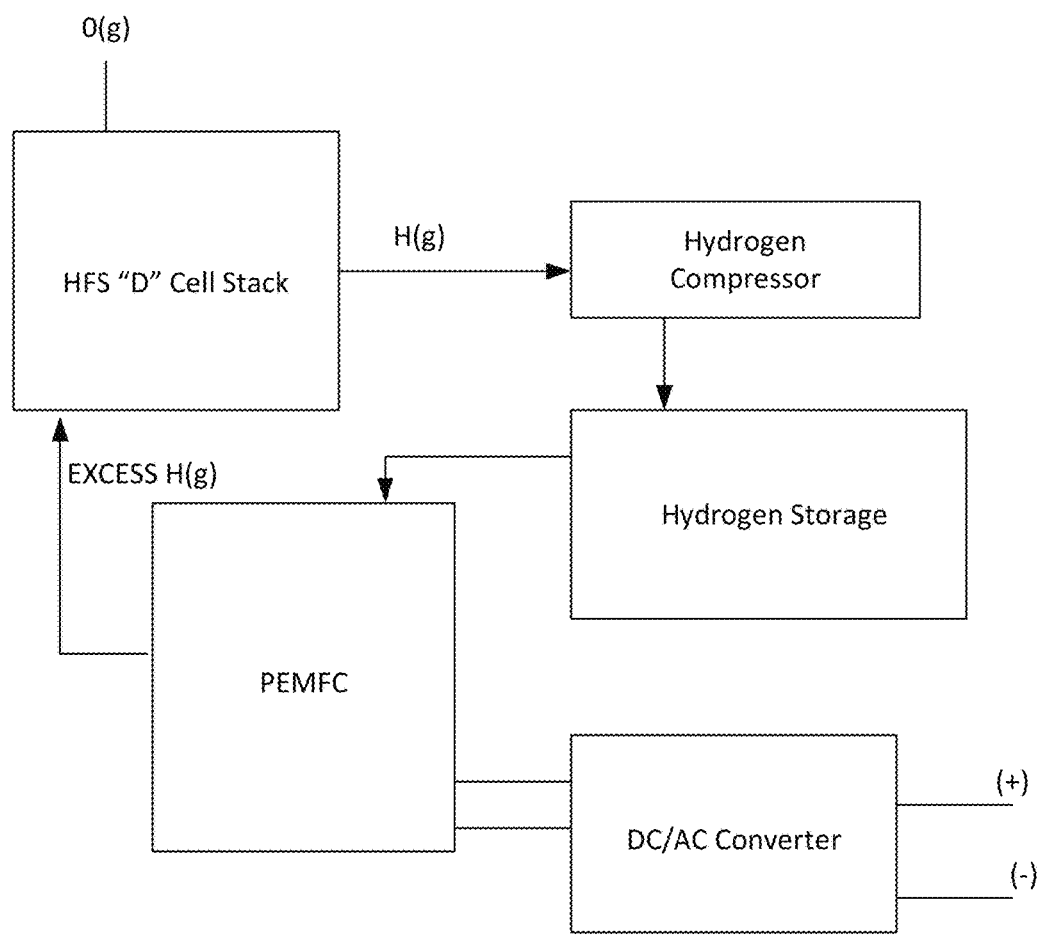
Figure 15:
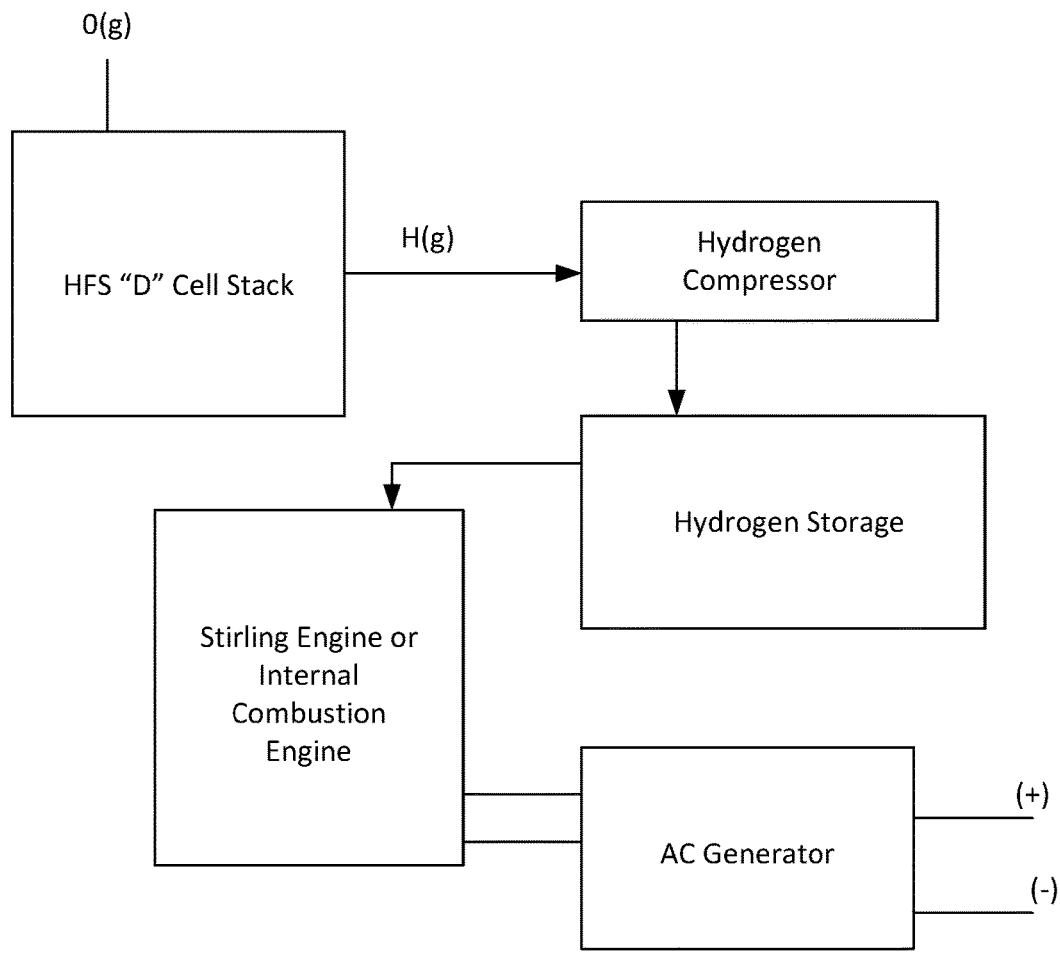

FIGS. 14 and 15 depict various schematics of hydrogen fuel systems 1500. The hydrogen fuel systems 1500 may be utilized to distribute hydrogen gas to engines positioned within conventional vehicles or stationary engines in electric generation unties, air compressors, etc. Embodiments of hydrogen fuel systems 1500 are configured to reduce the amount of fossil fuel consumed by an internal combustion engine, while reducing emissions from the exhaust into the atmosphere.

Hydrogen fuel system 1500 may be configured to allow an engine to burn fossil fuel more efficiently by introducing hydrogen gas and oxygen gas into the air/fuel mixture that the internal combustion engine operates with. Hydrogen fuel system 1500 may be configured to generate its own hydrogen gas from water, such that hydrogen fuel system 1500 may be self-contained and mounted on or within an automobile. Hydrogen fuel system 1500 may utilize a hydrogen generating cell and controls to operate hydrogen fuel system 1500 via a vehicle's existing electronic control unit. When installed, hydrogen fuel system may utilize a water mixture and fuel additive to use two thirds less fuel and produce one third the emissions of conventional vehicles.

FIG. 16 depicts different configurations of hydrogen fuel systems.

Figure 17:
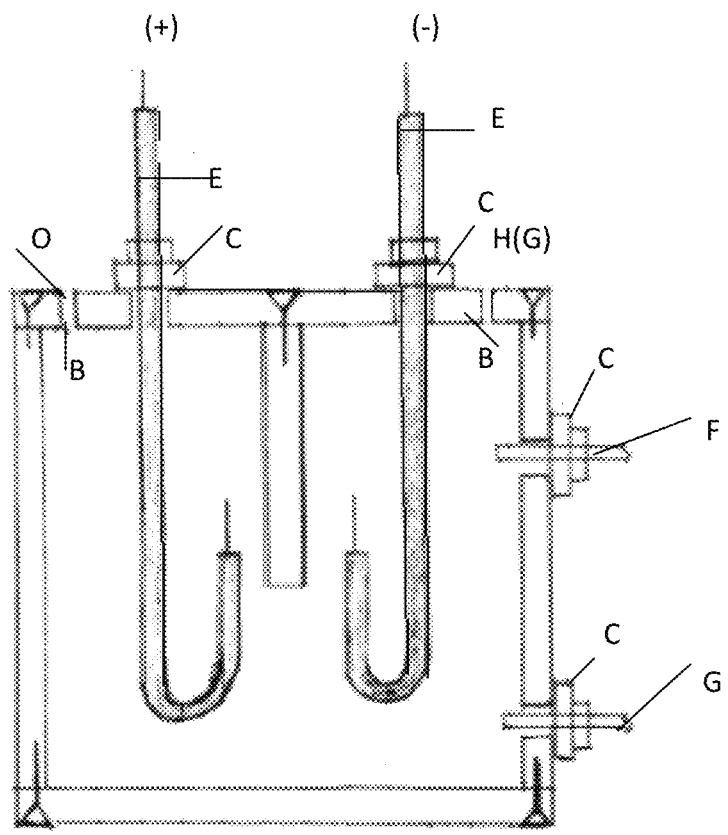

FIG. 17 depicts an embodiment of a hydrogen fuel system, wherein element C may be a compression fitting, element E may be an insulated electrode, element F may indicate a flow/level controller, element G may be an inlet, and element D may be gas outlets.

Figure 18:
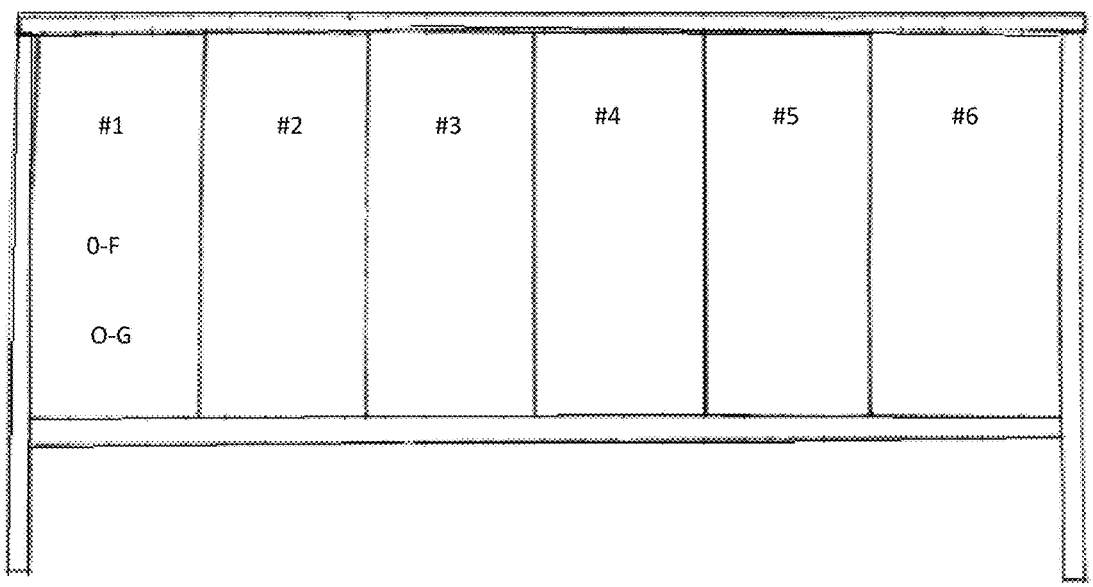
Figure 19:
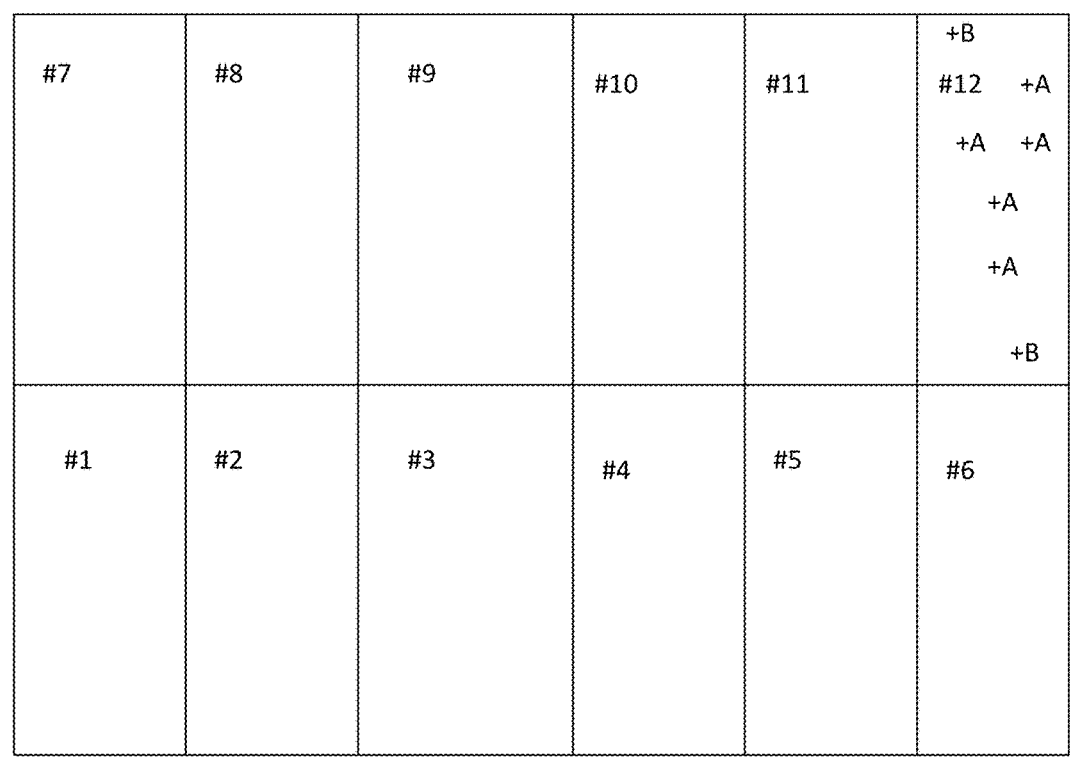

FIGS. 18 and 19 depict a hydrogen fuel system according to an embodiment.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A hydrogen fuel system configured to reduce an amount of fossil fuel consumed by an internal combustion engine, the system comprising:
    a hydrogen cell housing configured to break electrochemical bonds within liquid positioned within the hydrogen cell;
    an anode tube positioned within the hydrogen cell, the anode tube including an anode, an open top end, and an open bottom end;
    a cathode chamber including an cathode, wherein the anode tube is positioned within the cathode chamber, the anode tube extending from a top surface of the cathode chamber towards a bottom surface of the cathode chamber;
    a positive voltage of a battery coupled to the anode;
    a negative voltage of the battery coupled to the cathode;
    a turbine positioned at the bottom surface of the cathode chamber, the turbine being configured to circulate liquid positioned within the cathode chamber;
    an overfill outlet positioned above the open bottom end of the an anode on the cathode chamber.

2. The system of claim 1, further comprising:
    a tank configured to house the hydrogen cell housing, wherein a liquid level within the tank is positioned below the overfill outlet.

3. The system of claim 2, further comprising:
    a water transfer line configured to transfer liquid from the tank into the open top end of the anode tube.

4. The system of claim 1, further comprising:
    a hydrogen tube extending into the top surface of the cathode chamber, and the hydrogen tube being configured to vacuum hydrogen gas within the cathode chamber into the internal combustion engine.

* * * * *